US008096125B2

(12) United States Patent
Hepburn et al.

(10) Patent No.: US 8,096,125 B2
(45) Date of Patent: Jan. 17, 2012

(54) METHODS AND SYSTEMS FOR EMISSION SYSTEM CONTROL

(75) Inventors: Jeffrey Scott Hepburn, Birmingham, MI (US); William Charles Ruona, Farmington Hills, MI (US); Brien Lloyd Fulton, West Bloomfield, MI (US); Gopichandra Surnilla, West Bloomfield, MI (US); Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/645,793

(22) Filed: Dec. 23, 2009

(65) Prior Publication Data
US 2011/0131957 A1 Jun. 9, 2011

(51) Int. Cl.
F02B 33/44 (2006.01)
F02B 37/00 (2006.01)
F02M 25/07 (2006.01)
F02M 25/06 (2006.01)
F01N 5/04 (2006.01)
F01N 3/00 (2006.01)

(52) U.S. Cl. ............. 60/605.2; 60/278; 60/280; 60/286; 60/295; 123/568.12; 701/108

(58) Field of Classification Search ................. 60/605.2, 60/605.1, 612, 274, 280, 285–286, 288, 295, 60/311, 278; 701/108; 123/568.12, 568.11, 123/568.17; F02M 25/07; F01N 3/08, 3/24, F01N 3/00
See application file for complete search history.

(56) References Cited

U.S. PATENT DOCUMENTS

| 6,651,432 | B1* | 11/2003 | Gray, Jr. ........................ 60/605.2 |
| 6,742,331 | B2 | 6/2004 | Minami ........................... 60/287 |
| 6,981,375 | B2 | 1/2006 | Sisken et al. .................. 60/605.2 |
| 7,043,914 | B2* | 5/2006 | Ishikawa ...................... 60/605.2 |
| 7,047,741 | B2* | 5/2006 | Gray, Jr. ........................ 60/605.2 |
| 7,681,394 | B2* | 3/2010 | Haugen ......................... 60/605.2 |
| 2003/0213231 | A1 | 11/2003 | Tabata ............................. 60/280 |
| 2004/0050047 | A1 | 3/2004 | Arnold ......................... 60/605.2 |
| 2008/0006024 | A1 | 1/2008 | Tahara et al. ................... 60/274 |
| 2008/0034739 | A1 | 2/2008 | Ranalli .................... 123/568.11 |
| 2008/0092861 | A1 | 4/2008 | Duffy et al. .................. 60/605.2 |
| 2008/0209889 | A1 | 9/2008 | Scheinert ........................ 60/286 |

(Continued)

FOREIGN PATENT DOCUMENTS
FR 2799503 A1 * 4/2001
(Continued)

OTHER PUBLICATIONS

An attached machine translation Nobuyuki et al. (Pub. No. JP 2002-174110 A), published on Jun. 21, 2002.*

(Continued)

Primary Examiner — Thai Ba Trieu
(74) Attorney, Agent, or Firm — Allan J. Lippa; Alleman Hall McCoy Russell & Tuttle LLP

(57) ABSTRACT

Methods and systems are provided for operating a turbocharged engine including a particulate filter positioned upstream of a turbocharger turbine, a catalyst positioned downstream of the turbine, and an EGR passage coupled between an engine exhaust and engine intake. In one example, the method comprises, diverting exhaust gas from downstream of the filter to the engine intake via the EGR passage, and adjusting an amount of diverted exhaust gas based on filter operating conditions.

18 Claims, 9 Drawing Sheets

U.S. PATENT DOCUMENTS

| | | | |
|---|---|---|---|
| 2009/0288392 A1 * | 11/2009 | Yang et al. ................... | 60/274 |
| 2010/0043761 A1 * | 2/2010 | Joergl et al. ............. | 123/568.12 |
| 2010/0064686 A1 * | 3/2010 | Mondori .................. | 60/605.2 |

FOREIGN PATENT DOCUMENTS

| | | |
|---|---|---|
| JP | 2002174110 A * | 6/2002 |
| JP | 2002339810 | 11/2002 |
| JP | 2004340138 | 11/2004 |
| JP | 2005002991 | 1/2005 |
| JP | 2005054771 | 3/2005 |
| JP | 2005207281 | 8/2005 |
| JP | 2006503208 | 1/2006 |
| JP | 2006183508 | 7/2006 |
| JP | 2008069690 | 3/2008 |
| JP | 2008128046 | 6/2008 |
| JP | 2008128048 | 6/2008 |
| JP | 2008183509 | 8/2008 |
| JP | 2009121330 | 6/2009 |
| JP | 2009127496 | 6/2009 |
| JP | 2009127497 | 6/2009 |

OTHER PUBLICATIONS

Hepburn, Jeffrey S. et al., "Methods and Systems for Emission System Control," U.S. Appl. No. 12/645,780, filed Dec. 23, 2009, 43 pages.

Hepburn, Jeffrey S. et al., "Methods and Systems for Emission System Control," U.S. Appl. No. 12/645,826, filed Dec. 23, 2009, 44 pages.

* cited by examiner

US 8,096,125 B2

METHODS AND SYSTEMS FOR EMISSION SYSTEM CONTROL

FIELD

The present application relates to methods and systems for emission control of a vehicle with a selective catalytic reduction (SCR) catalyst and a particulate filter.

BACKGROUND AND SUMMARY

Engine systems may use EGR (exhaust gas recirculation) to address exhaust NOx emissions. For example, EGR systems may divert exhaust gas from upstream of an exhaust turbine to downstream of an intake compressor, or from downstream of an exhaust turbine to upstream of an intake compressor. Various approaches may be used to control EGR systems and coordinate EGR operations with emission control operations. One example approach is illustrated by Arnold in US 2004/0050047 A1. Therein, a particulate filter is included in the EGR passage so that particulates may be removed from the EGR flow before exhaust gases are recirculated through the intake.

However, the inventors herein have recognized several potential issues with such an approach. As one example, to regenerate the filter, hot exhaust gas may have to be passed through the EGR passage. The heated EGR flow may, however, decrease the engine performance and increase fuel penalties. On the other hand, without the filter, and/or without filter regeneration, particulate matter recirculated into the intake with the EGR flow may cause compressor fouling and degrade engine performance.

In one example, the above mentioned issues may be addressed by a method of operating a turbocharged engine including a particulate filter positioned upstream of a turbocharger turbine, a catalyst positioned downstream of the turbine, and an EGR passage coupled between an engine exhaust and engine intake. In one embodiment, the method comprises, diverting exhaust gas from downstream of the filter to the engine intake via the EGR passage; and adjusting an amount of diverted exhaust gas based on filter operating conditions In this way, by adjusting EGR based on filter operation, it is possible to reduce EGR recirculation, if needed, during filter regeneration. By positioning the particulate filter upstream of the turbocharger turbine and upstream of an EGR passage inlet, both EGR and particulate filter benefits may be achieved. Specifically, as noted above, when EGR is desired, exhaust gas may be recirculated through the EGR passage after passing through the filter, thereby providing a clean EGR flow to the intake and reducing compressor degradation. Then, when filter regeneration is desired, heated exhaust may be passed through the filter but may not be recirculated (or may be recirculated to a lesser degree) through the EGR passage, thereby reducing engine performance degradation due to hot EGR flow. Furthermore, by reducing the amount of hot exhaust that is recirculated to the engine intake during filter regeneration, the thermal demands on an EGR cooler may also be reduced, thereby providing engine additional engine performance and fuel economy benefits.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
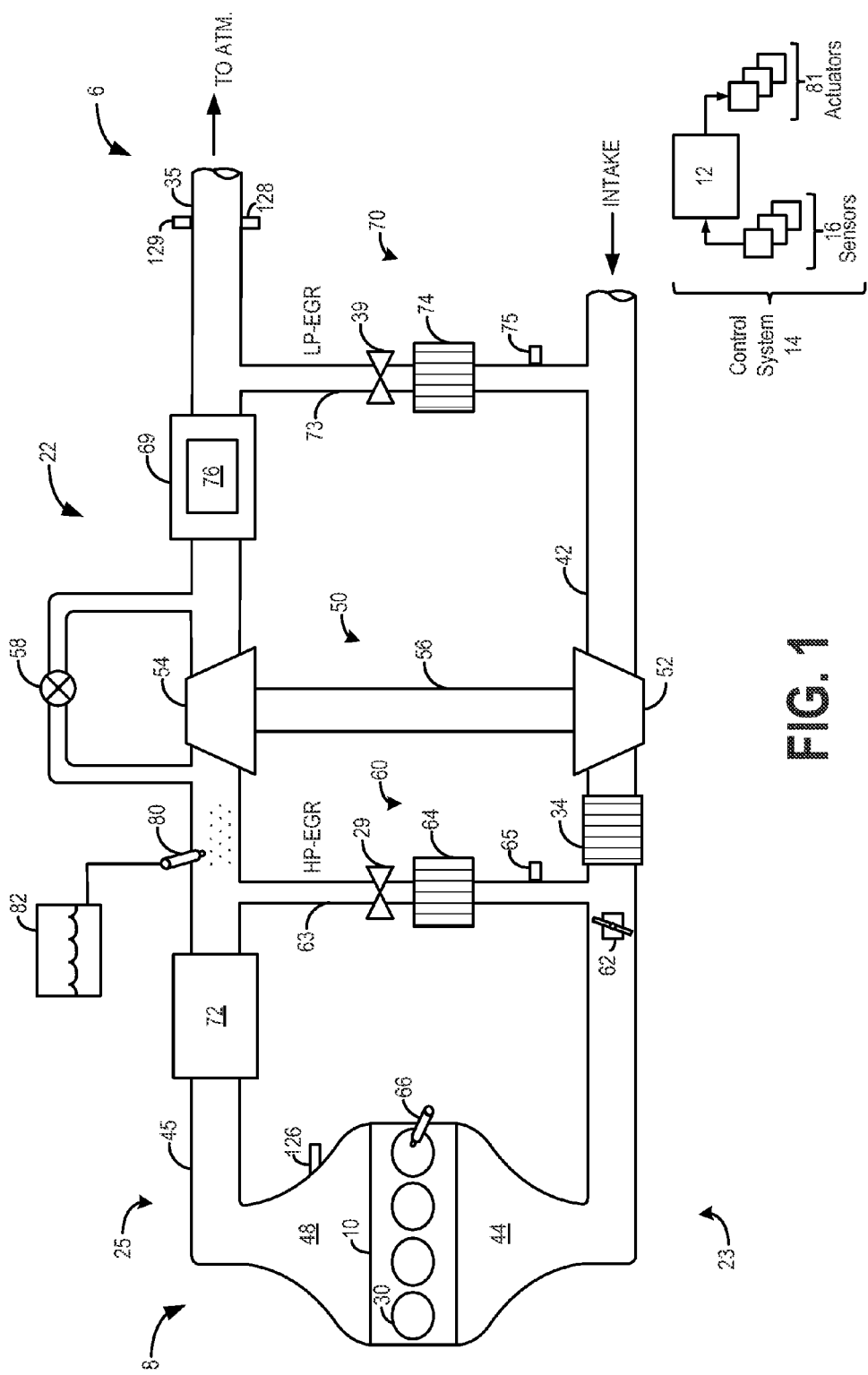
FIG. 1 shows a schematic depiction of an internal combustion engine and an associated emission control system.
Figure 2:
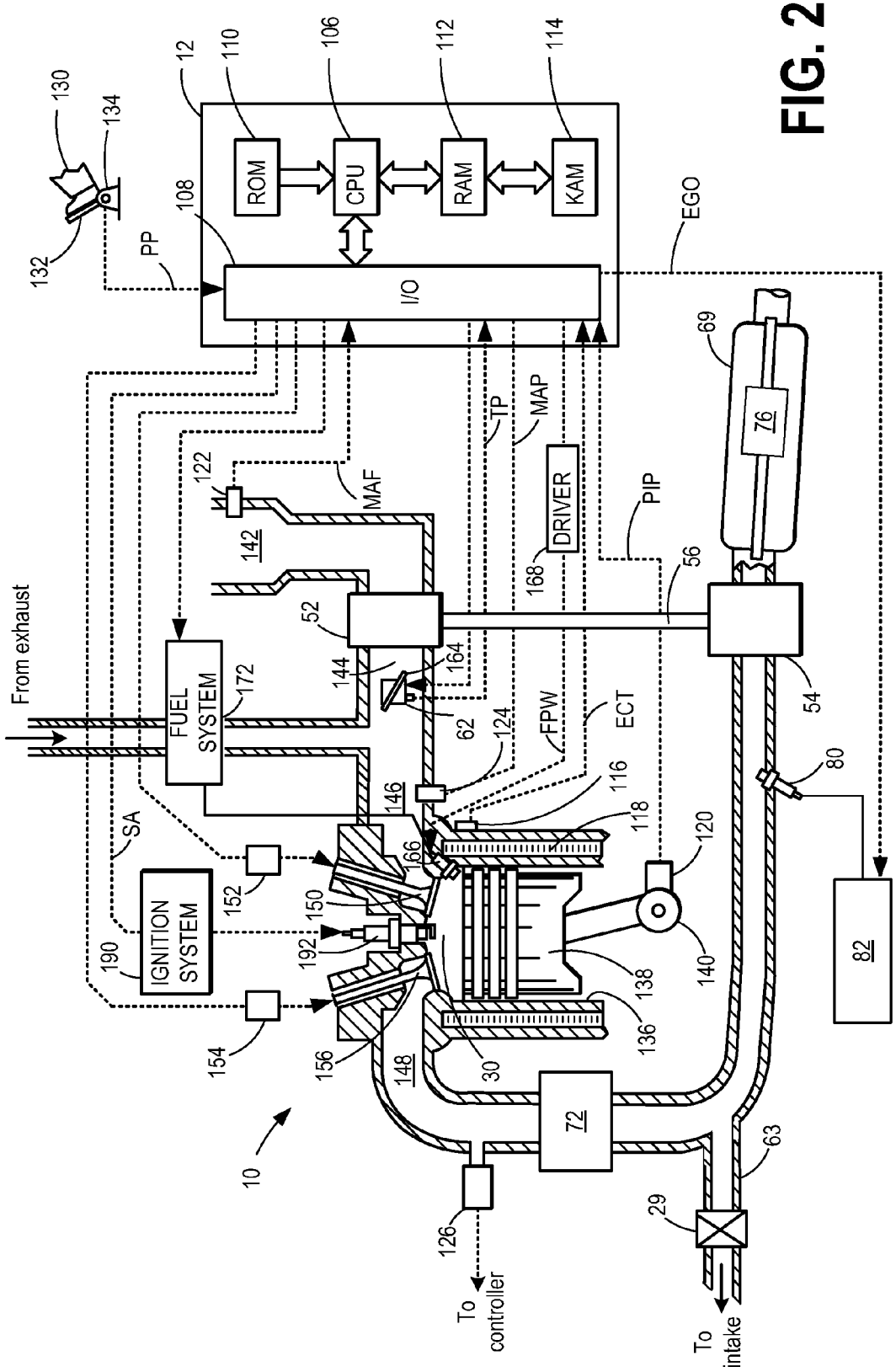
FIG. 2 shows a partial engine view.

The following description relates to systems and methods for operating an emission control system associated with a turbocharged internal combustion engine. As shown in FIGS. 1-2, the emission control system includes a catalyst, such as an SCR catalyst, downstream of the turbocharger turbine, and a particulate filter, such as a diesel particulate filter (DPF), upstream of the turbine. A controller may be configured to perform a control routine, such as the routine of FIGS. 3A-B to coordinate the operation of the various emission control devices with each other, and with other engine operations such as exhaust gas recirculation and boosting.

The emission control system also includes a reductant injector upstream of the turbine. By injecting reductant upstream of the turbine and mixing the injected reductant with exhaust gas via the turbine, the vaporization of the reductant may be improved. At the same time, by positioning the catalyst downstream of the turbine, the well-mixed reductant may be delivered to the catalyst without affecting the temperature characteristics of the catalyst. A controller may be configured to perform a control routine, such as the routine of FIGS. 5 and 7 to adjust the amount of reductant injected based on operating conditions, such as an amount of boost provided by the turbocharger, and to adjust the turbocharger wastegate to enable improved mixing of the injected reductant with exhaust gases.

By including a particulate filter upstream of the turbocharger, additional benefits may be achieved. For example, turbo lag conditions may be addressed synergistically during filter regeneration. By injecting fuel into one or more engine cylinders via a late post injection in an exhaust stroke of the engine cycle, the temperature of the exhaust gas may be increased before spooling up the turbocharger turbine. By increasing the exhaust temperature, the filter may be regenerated while the exhaust also increases turbine speed and reduces turbo lag. A controller may be configured to perform control routines, such as the routine of FIG. 4, to adjust the timing and/or amount of the injection based on the amount of heat needed to increase the temperature of the particulate filter for regeneration and/or the amount of heat needed to increase the turbine speed to provide the desired torque.

By positioning the filter upstream of the turbine, and the catalyst downstream of the turbine, temperature control and coordination between the emission control devices may also be achieved. For example, the temperature of the SCR catalyst may be maintained even while the filter is being regenerated. A controller may be configured to perform control routines, such as the routine of FIG. 6, to adjust a turbine wastegate during filter regeneration to adjust an exhaust flow that is directed towards the SCR catalyst. In this way, the temperature of the SCR catalyst may be controlled during the different filter operating modes.

The engine system may further include one or more EGR passages for recirculating at least some exhaust gas into the engine intake. For example, an EGR passage may divert exhaust gas from upstream of the turbine and downstream of the particulate filter into the engine intake downstream of the compressor. By positioning the particulate filter upstream of the turbocharger turbine and upstream of the EGR passage inlet, both EGR and particulate filter benefits may be achieved. Thus, when EGR is desired, more exhaust gas may be recirculated through the EGR passage after passing through the filter, thereby providing a clean EGR flow to the intake. In this way, EGR cooler, EGR valve, intake manifold, and intake valve degradation may be reduced, for example. Then, when filter regeneration is desired, less exhaust gas may be recirculated through the EGR passage after passing through the filter, thereby reducing engine performance degradation due to hot EGR flow. A controller may be configured to perform control routines, such as the routine of FIG. 8, to adjust an amount of EGR flow based on filter operation, to thereby coordinate the EGR system with the emission control system.

FIG. 1 shows a schematic depiction of a vehicle system 6. The vehicle system 6 includes an engine system 8, including engine 10, coupled to emission control system 22. Engine 10 includes a plurality of cylinders 30. Engine 10 also includes an intake 23 and an exhaust 25. Intake 23 includes a throttle 62 fluidly coupled to the engine intake manifold 44 via intake passage 42. Exhaust 25 includes an exhaust manifold 48 leading to an exhaust passage 45 that routes exhaust gas to the atmosphere via tailpipe 35.

Engine 10 may further include a boosting device, such as turbocharger 50. Turbocharger 50 may including a compressor 52 arranged along intake passage 42. The compressor 52 may be at least partially driven by turbine 54, arranged along exhaust passage 45, via shaft 56. The amount of boost provided by the turbocharger may be varied by an engine controller. For example, the amount of boost may be adjusted by controlling wastegate 58. In one example, the amount of boost may be decreased by opening wastegate 58 and allowing more exhaust gas to by-pass the turbine. Alternatively, the amount of boost may be increased by closing the wastegate (or reducing the opening of the wastegate) and allowing less exhaust gas to by-pass the turbine. In other examples, turbine 54 may be a variable geometry turbine (VGT) or a variable nozzle turbine (VNT). The VGT or VNT may be adjusted to meet boost requirements. Further, the wastegate, VNT, and/or VGT may be adjusted to prevent overspeed conditions from occurring in the turbocharger. In some embodiments, an optional charge after-cooler 34 may be included downstream of compressor 52 in intake passage 42. The after-cooler may be configured to reduce the temperature of the intake air compressed by turbocharger 50.

Emission control system 22, coupled to exhaust passage 45, may include one or more emission control devices 69 mounted in a close-coupled position in the exhaust. One or more emission control devices may include particulate filter 72, SCR catalyst 76, three-way catalyst, lean NOx trap, oxidation catalyst, etc. The emission control devices may be positioned upstream and/or downstream of turbine 54 in exhaust passage 45. In one embodiment, as depicted, particulate filter 72 may be positioned upstream of turbocharger turbine 54 while SCR catalyst 76 may be positioned downstream of turbocharger turbine 54. In one example, particulate filter 72 may be an uncoated diesel particulate filter. In alternate embodiments, particulate filter 72 may include a catalytic washcoat. Catalytic washcoats used may include, for example, palladium, a hydrocarbon adsorbent (such as activated carbon or zeolite), an SCR catalyst, a HC adsorbent-SCR catalyst combination, etc.

Reductant injector 80, positioned upstream of turbocharger turbine 54, may inject reductant 82, such as urea or ammonia, into the exhaust for reaction with NOx species in the SCR catalyst 76. Specifically, injector 80 may inject reductant 82 into the exhaust upstream of turbine 54 and downstream of particulate filter 72, responsive to signals received from the engine controller. By injecting reductant upstream of the turbine, and delivering the injected reductant to the SCR catalyst via the turbine, the vaporization of the reductant and the mixing of the reductant with exhaust gases may be improved. As elaborated with reference to FIG. 5, the wastegate of the turbine may be adjusted to control an amount of mixing of the reductant with exhaust gases. Further, as elaborated herein with reference to FIG. 7, an amount and/or timing of reductant injection may be adjusted based on engine operating conditions such as changes in boost, and changes in wastegate positions. In alternate embodiments, reductant injector 80 may be positioned downstream of turbine 54.

Engine 10 may further include one or more exhaust gas recirculation (EGR) passages for recirculating at least a portion of exhaust gas from the engine exhaust (specifically, exhaust passage 45) to the engine intake (specifically, intake passage 42). In one embodiment, a first EGR system 60 and a second EGR system 70 may be included. Specifically, first EGR system 60 may divert a portion of exhaust gas from upstream of turbine 54, and downstream of filter 72, to the engine intake downstream of compressor 52 via HP-EGR passage 63. In this configuration, first EGR system 60 may provide high-pressure EGR (HP-EGR). Second EGR system 70 may divert a portion of exhaust gas from downstream of turbine 54 to the engine intake upstream of compressor 52 via LP-EGR passage 73. In this configuration, second EGR system 70 may provide low-pressure EGR (LP-EGR). In one example, HP-EGR system 60 may be operated during a first condition, such as in the absence of boost provided by turbocharger 50, while LP-EGR system 70 may be operated during a second condition, such as in the presence of turbocharger boost and/or when exhaust gas temperature is above a threshold. In other examples, both HP-EGR system 60 and LP-EGR system 70 may be operated simultaneously.

Each EGR passage may further include an EGR cooler. For example, HP-EGR system 60 may include HP-EGR cooler 64 while LP-EGR system 70 may include LP-EGR cooler 74. HP-EGR cooler 64 and LP-EGR cooler 74 may be configured to lower the temperature of exhaust gas flowing through the respective EGR passages before recirculation into the engine intake. Under certain conditions, the LP-EGR cooler 74 may be used to heat the exhaust gas flowing through LP-EGR system 70 before the exhaust gas enters the compressor to avoid water droplets impinging on the compressor. In some embodiments, one or more of the EGR cooler channels may be coated with an SCR catalyst to enable additional exhaust treatment before recirculation to the intake.

While the depicted embodiment illustrates LP-EGR passage 73 diverting at least a portion of exhaust gas from downstream of SCR catalyst 76, in alternate embodiments, LP-EGR passage 73 may be configured to divert at least a portion of exhaust gas from upstream of SCR catalyst 76. In one example, by diverting exhaust gas from upstream of SCR catalyst 76 to the engine intake, EGR passage plumbing may be shortened while increasing the pressure difference available. In still other embodiments, one or more catalysts (e.g., an SCR catalyst and/or a diesel oxidation catalyst) may be included in LP-EGR passage 73, for example, upstream of LP-EGR cooler 74. An exhaust back-pressure valve may optionally also be included. Alternatively, an intake throttle disposed in the intake upstream of the compressor may be used instead of an exhaust throttle. In one example, by including an SCR in LP-EGR passage 73, and diverting exhaust gas from upstream of SCR catalyst 76, at least some injected reductant (for example, excess of a threshold amount) may be stored in the SCR, to reduce ammonia slip without NOx remake. However, by including an oxidation catalyst in LP-EGR passage 73, and diverting exhaust gas from upstream of SCR catalyst 76, at least some injected reductant (for example, excess of a threshold amount) may be consumed on the oxidation catalyst, to reduce ammonia slip without NOx remake.

In one example, HP-EGR system 60 may divert a portion of exhaust gas downstream of the compressor upstream of charge air cooler 34. In another example, HP-EGR system 60 may divert a portion of exhaust gas downstream of the compressor downstream of charge air cooler 34. In one embodiment, HP-EGR system 60 may further include a bypass passage (not shown) configured to divert a portion of exhaust gas from HP-EGR passage 63, upstream of HP-EGR cooler 64, to the engine intake, downstream of charge air cooler 34, thereby bypassing both coolers. In this way, by bypassing both the HP-EGR cooler and the compressor charge air cooler, heated exhaust may be directed to the engine intake without cooling, when desired, to expedite engine warm-up. Additionally, HP-EGR cooler fouling may be reduced.

An engine controller 12 may adjust an amount (and/or rate) of exhaust gas diverted via the EGR passage(s) based on engine operating conditions, exhaust gas temperature, intake manifold temperature, an operating mode of the particulate filter (or a degree of filter regeneration), catalyst conditions, etc. Each EGR passage may include an EGR valve, and the controller 12 may be configured to adjust an amount of diverted exhaust gas by adjusting the opening of the respective EGR valve. For example, an amount and/or rate of HP-EGR provided to intake manifold 44 may be adjusted via HP-EGR valve 29. HP-EGR sensor 65 may be positioned within HP-EGR passage 63 to provide an indication of one or more of a pressure, temperature, composition, and concentration of exhaust gas recirculated through HP-EGR system 60. Similarly, an amount and/or rate of LP-EGR provided to intake passage 42 may be varied by controller 12 via LP-EGR valve 39. LP-EGR sensor 75 may be positioned within LP-EGR passage 73 to provide an indication of one or more of a pressure, temperature, composition, and concentration of exhaust gas recirculated through LP-EGR system 70.

In some examples, one or more sensors may be used to determine a total amount of exhaust gas flowing through the HP-EGR and LP-EGR systems. For example, an UEGO sensor may be positioned within intake passage 42 downstream of the HP-EGR system outlet to determine a total amount of EGR. For example, total EGR control may be based on intake oxygen concentration or a burned mass fraction, since intake oxygen concentration may be directly related to EGR corrected for exhaust oxygen concentration.

Under some conditions, exhaust gas recirculation through HP-EGR system 60 and/or LP-EGR system 70 may be used to regulate the temperature of the air and fuel mixture within the intake manifold, and/or reduce NO formation of combustion by reducing peak combustion temperatures, for example. As elaborated herein with reference to FIG. 8, under some conditions, for example during particulate filter 72 regeneration and/or when exhaust gas temperature is above a threshold, the amount of exhaust gas diverted to the engine intake along EGR passage 63 may be reduced to reduce engine performance degradation due to hot EGR flow. By diverting exhaust gas from upstream of the turbine and downstream of the particulate filter, advantageous synergies between the emission control system and the EGR system may be achieved. For example, exhaust gas may be cleaned upon passage through the filter. Thus, clean exhaust gas, from which particulate matter has been substantially removed, may be diverted to the engine intake, thereby reducing intake manifold and EGR cooler and valve fouling due to exhaust particulates, for example.

Engine 10 may be controlled at least partially by a control system 14 including controller 12 and by input from a vehicle operator via an input device (not shown). Control system 14 is shown receiving information from a plurality of sensors 16 (various examples of which are described herein) and sending control signals to a plurality of actuators 81. As one example, sensors 16 may include exhaust gas sensor 126 located upstream of the emission control device, exhaust temperature sensor 128 and exhaust pressure sensor 129 located downstream of the emission control system in tailpipe 35, HP-EGR sensor 65 located in HP-EGR passage 63, and LP-EGR sensor 75 located in LP-EGR passage 73. In some examples, sensors 16 may include one or more sensors used to determine a total amount of EGR, for example based on burned mass fraction and/or intake oxygen. Other sensors such as additional pressure, temperature, air/fuel ratio and composition sensors may be coupled to various locations in the vehicle system 6. As another example, actuators 81 may include fuel injector 66, HP-EGR valve 29, LP-EGR valve 39, throttle 62, reductant injector 80, and wastegate 58. Other actuators, such as a variety of additional valves and throttles, may be coupled to various locations in vehicle system 6. Controller 12 may receive input data from the various sensors, process the input data, and trigger the actuators in response to the processed input data based on instruction or code programmed therein corresponding to one or more routines. Example control routines are described herein with regard to FIGS. 3-8.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a turbocharger including a compressor 52 arranged between intake air passages 142 and 144, and an exhaust turbine 54 arranged along exhaust passage 148. Compressor 52 may be at least partially powered by exhaust turbine 54 via shaft 56. In some embodiments, shaft 56 may be coupled to an electric motor to provide an electric boost, as needed. A throttle 62 including a throttle plate 164 may be provided along an intake passage of the engine for varying the flow rate and/or pressure of intake air provided to the engine cylinders. For example, throttle 62 may be disposed downstream of compressor 52, as shown, or may be alternatively provided upstream of compressor 52. In some examples, throttles may be disposed both upstream and downstream of compressor 52.

Exhaust passage 148 can receive exhaust gases from other cylinders of engine 10 in addition to cylinder 30. Exhaust gas sensor 126 is shown coupled to exhaust passage 148 upstream of emission control device 69. Sensor 126 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. In some examples, sensor 126 may be coupled to the exhaust passage downstream of turbine 52 and emission control device 69. Emission control device 69 may be a three way catalyst (TWC), NOx trap, various other emission control devices, or combinations thereof. For example, emission control device 69 may include SCR catalyst 76 positioned downstream of turbine 54. SCR catalyst 76 may be configured to reduce exhaust NOx species to nitrogen upon reaction with reductant, such as ammonia or urea. Reductant injector 80 may inject reductant 82 into exhaust passage 148 upstream of turbine 54. Exhaust passage 148 may also include a particulate filter 72, positioned upstream of turbine 54 and injector 80, for removing particulate matter from exhaust gas.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type, cam actuation type, electro-hydraulic type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation, and an exhaust valve controlled via cam actuation including CPS and/or VCT. In other embodiments, the intake and exhaust valves may be controlled by a common valve actuator or actuation system, or a variable valve timing actuator or actuation system. The engine may further include a cam position sensor whose data may be merged with the crankshaft position sensor to determine an engine position and cam timing.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including fuel injector 166 coupled directly to cylinder 30. Fuel injector 166 may inject fuel directly therein in proportion to the pulse width of signal FPW received from controller 12 via electronic driver 168. In this manner, fuel injector 166 provides what is known as direct injection (hereafter referred to as "DI") of fuel into combustion cylinder 30. While FIG. 2 shows injector 166 as a side injector, it may also be located overhead of the piston, such as near the position of spark plug 192. Alternatively, the injector may be located overhead and near the intake valve. Fuel may be delivered to fuel injector 166 from high pressure fuel system 172 including a fuel tank, fuel pumps, and a fuel rail. Alternatively, fuel may be delivered by a single stage fuel pump at lower pressure. Further, while not shown, the fuel tank may have a pressure transducer providing a signal to controller 12.

It will be appreciated that in an alternate embodiment, injector 166 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Controller 12 is shown in FIG. 2 as a microcomputer, including microprocessor 106, input/output ports 108, an electronic storage medium for executable programs and calibration values shown as read-only memory 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type, such as a crankshaft position sensor) coupled to crankshaft 140; throttle position (TP) from a throttle position sensor (not shown); and absolute manifold pressure signal (MAP) from sensor 124. Engine speed signal, RPM, may be generated by controller 12 from signal PIP (or the crankshaft position sensor). Manifold pressure signal MAP from a manifold pressure sensor may be used to provide an indication of vacuum, or pressure, in the intake manifold. Storage medium read-only memory 110 can be programmed with computer readable data representing instructions executable by microprocessor 106 for performing the methods described below as well as other variants that are anticipated but not specifically listed.

One or more exhaust gas recirculation (EGR) passages (as illustrated in FIG. 1) may route a desired portion of exhaust gas from exhaust passage 148 to intake passage 144. For example, a portion of exhaust gas that has been filtered through particulate filter 72 may be diverted to intake passage 144 via EGR passage 63. The amount of EGR flow provided to the intake may be varied by controller 12 via EGR valve 29. An EGR sensor (not shown) may be arranged within EGR passage 63 and may provide an indication of one or more of a pressure, temperature, and concentration of the exhaust gas. Under some conditions, the EGR system may be used to regulate the temperature of the air and fuel mixture within the combustion chamber, thus providing a method of controlling the timing of ignition during some combustion modes.

As described above, FIG. 2 shows only one cylinder of a multi-cylinder engine. As such each cylinder may similarly include its own set of intake/exhaust valves, fuel injector(s), spark plug, etc.

Figure 3A:
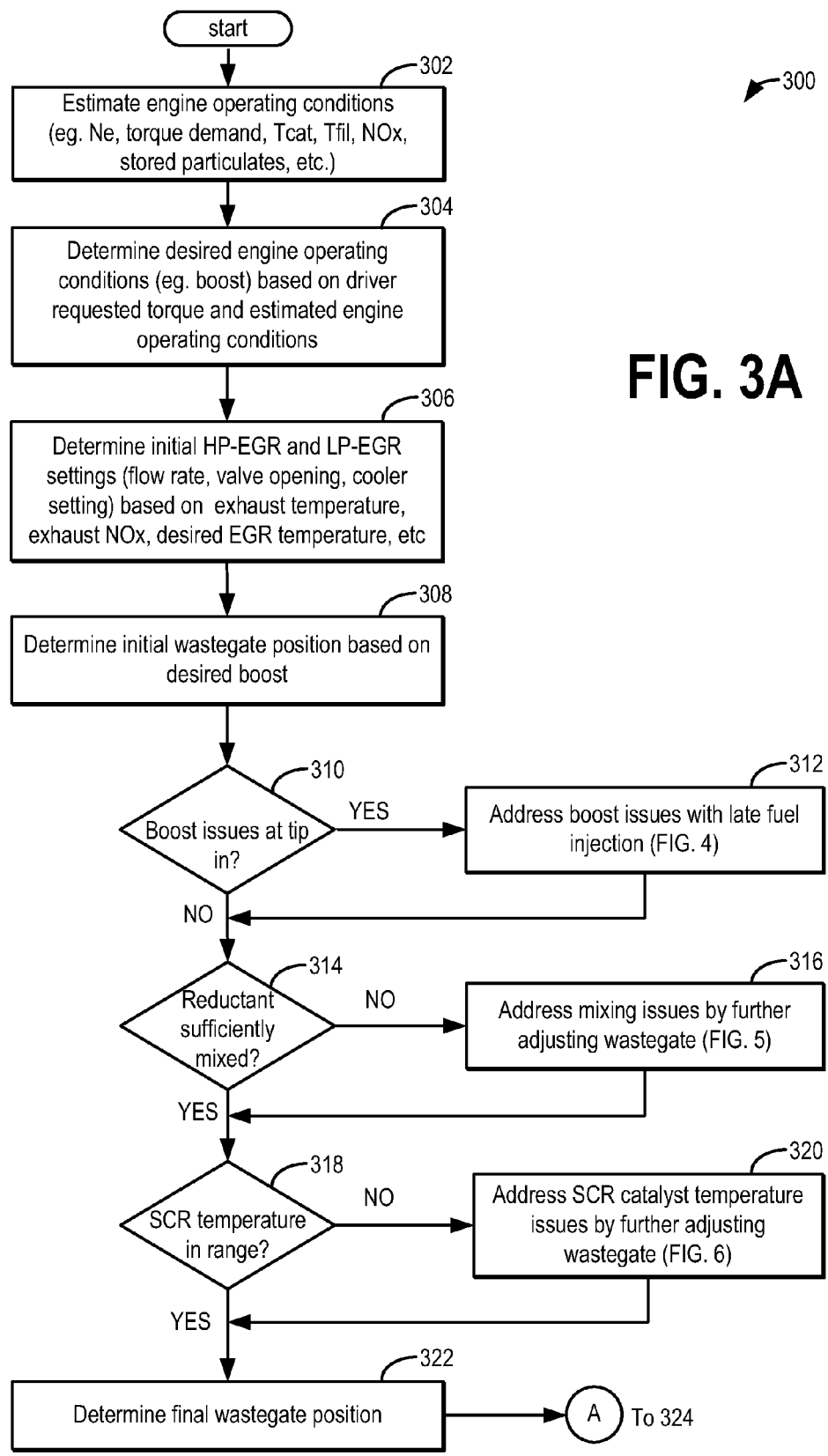
FIGS. 3A-B show a high level flow chart for operating the emission control system of FIG. 1, according to the present disclosure.
Figure 3B:
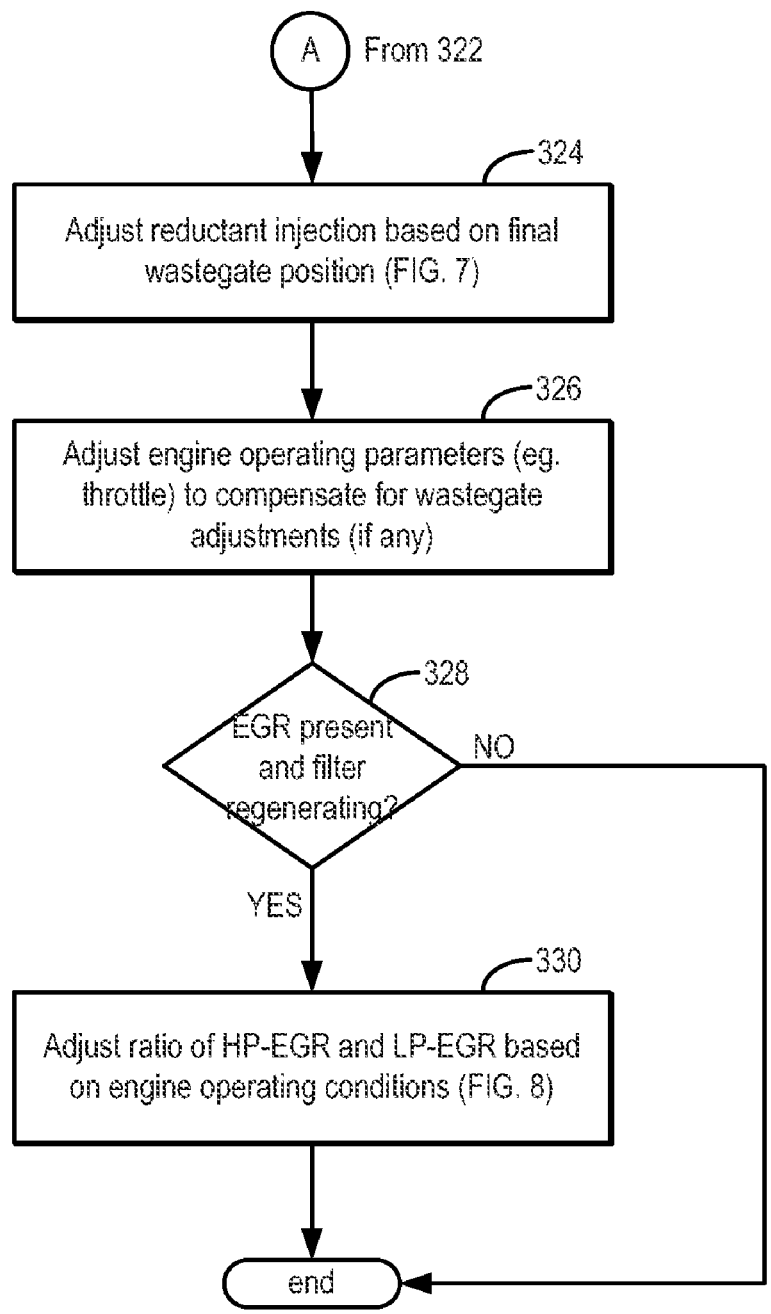

Now turning to FIGS. 3A-B, a routine 300 is depicted for coordinating the operation of the emission control system of FIG. 1 with turbocharger operations and EGR operations. Specifically, routine 300 enables adjustments to a turbocharger wastegate, in view of particulate filter regeneration, to control an SCR catalyst temperature and improve reductant mixing. The routine also enables wastegate adjustments, in view of filter regeneration, to thereby adjust an amount of exhaust gas recirculated via HP-EGR and LP-EGR. Further, the routine compensates for the wastegate adjustments, for example, through reductant injection and throttle position adjustments.

At 302, engine operating conditions may be measured and/or estimated. These may include, for example, a catalyst temperature (Tcat), for example, of SCR catalyst 76, a filter temperature (Tfil), for example, of particulate filter 72, engine speed (Ne), exhaust NOx levels, exhaust temperature, an amount of torque requested by the driver, etc. Additional SCR catalyst and filter conditions may also be estimated, for example, an amount of reductant stored on the SCR catalyst and/or an amount of particulates stored in the filter.

At 304, based on the estimated engine operating conditions and the requested torque, an amount of boost required to provide the requested torque may be determined. At 306, initial EGR settings may be determined based on the estimated exhaust NOx levels and exhaust temperatures to provide a desired EGR flow. For example, an initial ratio of HP-EGR to LP-EGR may be determined to provide a desired EGR temperature or manifold air temperature. The initial ratio of HP-EGR to LP-EGR may also depend on compressor inlet temperature to avoid over temperature conditions as well as mass flow and pressure ratio to avoid surge and choke. The initial ratio of HP-EGR and LP-EGR may enable at least some exhaust gas to be diverted to the engine intake system (downstream of the turbocharger compressor) from downstream of the particulate filter and upstream of the turbine while also enabling at least some exhaust gas to be diverted to the engine intake system (upstream of the turbocharger compressor) from downstream of the particulate filter and downstream of the turbine. The initial EGR settings determined may include flow rates, valve positions, EGR cooler settings, etc. At 308, based on the desired boost, an initial wastegate position may be determined.

At 310, it may be determined whether any boost issues have arisen in response to a driver tip-in. If no boost issues have arisen, the routine may directly proceed to 314. If boost issues are present, at 312, the routine may address the boost issues with a late fuel injection and wastegate adjustments, as further elaborated in FIG. 4, before proceeding to 314. At 314, it may be determined whether the injected reductant has sufficiently mixed with exhaust gases. If no mixing issues have arisen, the routine may directly proceed to 318. If mixing issues are present, at 316, the routine may address the mixing issues with further wastegate adjustments, as further elaborated in FIG. 5, before proceeding to 318. At 318, it may be determined whether the SCR catalyst temperature is within the desired operating range. If no temperature issues have arisen, the routine may directly proceed to 322. If the temperature is outside the range, at 320, the routine may address the catalyst temperature issues with further wastegate adjustments, as further elaborated in FIG. 6, before proceeding to 322.

At 322, the routine may determine a final wastegate position based on adjustments determined at 312, 316, and 320. In one example, the routine may prioritize the wastegate adjustments by giving each adjustment a different weightage. For example, wastegate adjustments responsive to SCR catalyst temperature issues and/or turbocharger overspeed conditions may be given higher weightage over wastegate adjustments responsive to boost issues. In one example, it may determined that SCR catalyst temperature issues may be addressed by increasing the wastegate opening, while at the same time it may be determined that boost issues may be addressed by decreasing the wastegate opening. Herein, in one example, the routine may over-ride the wastegate adjustments responsive to boost issues and increase the wastegate opening by a first, larger, amount to address the catalyst temperature issues only. In another example, the routine may consider the wastegate adjustments required to address the boost issues and increase the wastegate opening by a second, smaller, amount to address both issues. In still other examples, the adjustments to the different issues may be given equal weightage.

At 324, the routine may adjust an amount of reductant injected upstream of the turbine based on the final wastegate position. As further elaborated in FIG. 7, the reductant injection may be adjusted based on a change in boost arising from changes in wastegate position. At 326, other engine operating parameters may be adjusted to compensate for the wastegate adjustments. These may include, for example, changes in throttle position, changes in valve/cam timing, changes in spark timing, etc.

At 328, it may be determined whether EGR is present and whether the particulate filter is also regenerating at the same time. If both an EGR operation and a filter regeneration operation is confirmed, then at 330, a ratio of HP-EGR and LP-EGR may be adjusted based on the engine operating conditions, as further elaborated in FIG. 8.

In this way, the operation of emission control devices such as SCR catalysts and particulate filters may be coordinated with boost and EGR operations.

Figure 4:
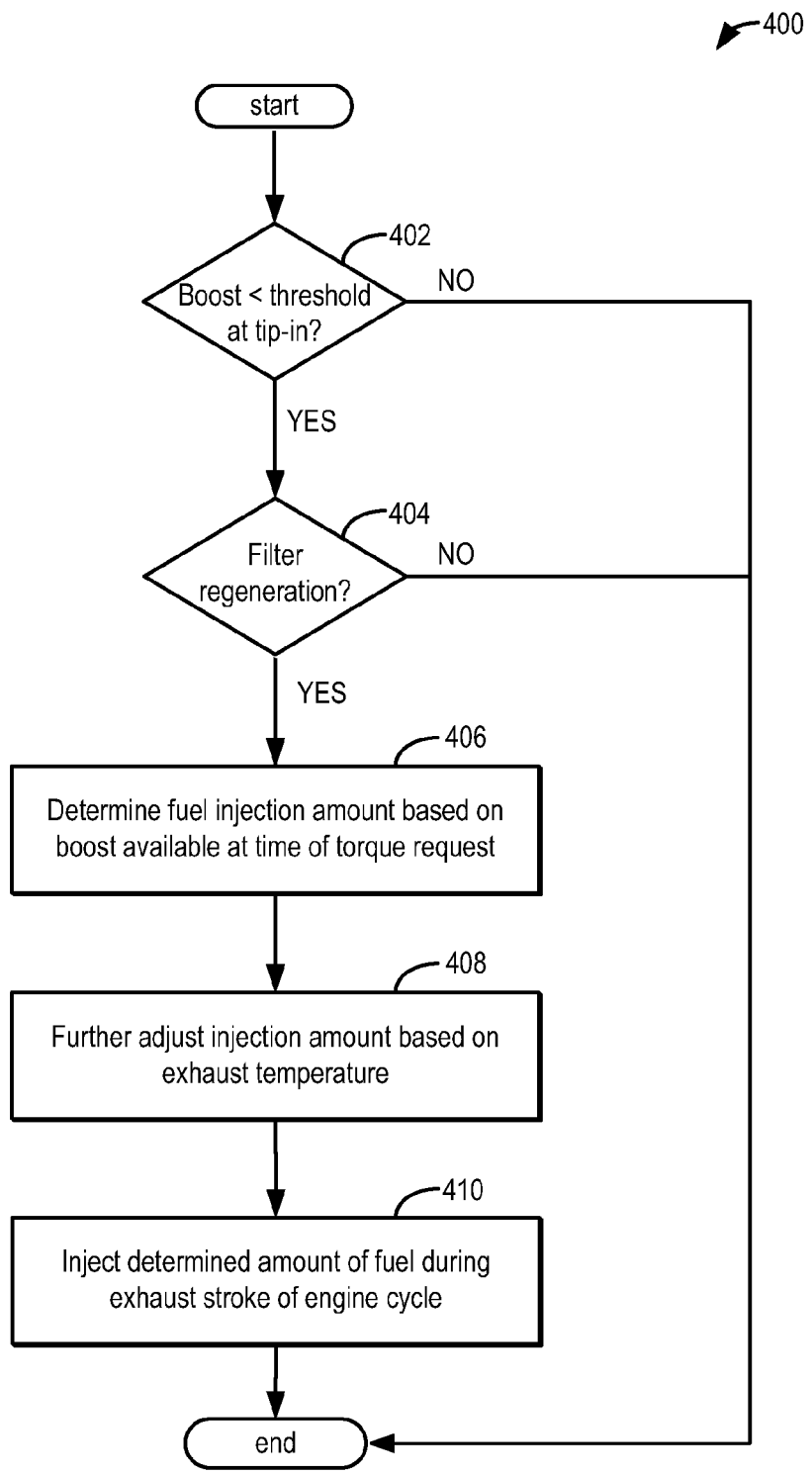
FIG. 4 shows a high level flow chart for addressing boost issues at driver tip-in based on filter regeneration conditions.

Now turning to FIG. 4, a routine 400 is illustrated for adjusting an amount of fuel that is late injected into the engine, based on filter regeneration and selected boosted operating conditions, such as during a driver tip-in. Routine 400 may be performed as part of control routine 300, specifically at 312.

At 402, it may be determined whether the amount of boost provided by the turbocharger is less than a threshold during a driver tip-in. Thus, it may be determined whether a turbo lag condition is present. In some examples, the threshold may be based on a desired boost amount. For example, at 402, it may be determined whether a difference between a desired and actual boost is below a threshold amount. Herein, the threshold may be adjusted based on the amount of torque requested by the driver. If the boost is not below the threshold, and an adequate amount of boost has been provided, the routine may end. If turbo lag is confirmed, at 404, it may be determined whether the particulate filter is regenerating (or will be regenerating). Filter regeneration may be performed if, for example, an amount of particulates stored in the filter is above a threshold, and/or the duration of filter operation in the storing mode is greater than a threshold.

If filter regeneration is confirmed, at 406, the routine may determine an amount of fuel to be late injected based on the boost level at the time of torque request. For example, an amount of fuel injected may be increased when the boost level is below the threshold. The amount of fuel late injected may be an amount that may raise the exhaust temperature sufficiently such that the heated exhaust may then increase turbine speed to produce the desired torque, and thereby reduce turbo lag. By reducing the turbo lag, the boost desired in response to the torque requested at driver tip-in may be provided. In an alternate embodiment, the amount of fuel late injected may be based on the amount of torque requested by the driver.

At 408, the amount of fuel late injected may be further adjusted based on the exhaust temperature. In one example, the exhaust temperature may be used to infer a filter temperature. Alternatively, the amount of fuel late injected may be adjusted based on filter temperature and/or an amount of stored particulates. The amount of fuel late injected may be adjusted, for example, to raise the exhaust temperature above a threshold where the filter may be regenerated and the stored particulates may be burned off. The threshold may be adjusted to attain a desired filter temperature and/or based on an amount of particulates stored in the filter at the time of regeneration. The adjustment may include, for example, increasing an amount of fuel injected as the exhaust temperature or filter temperature decreases (for example, decreases below the threshold) and/or increasing the amount of fuel injected as the amount of particulates stored in the filter increases.

At 410, the determined amount of fuel may be late injected upstream of the filter during an exhaust stroke of the engine cycle such that the injected fuel is not combusted in the engine cylinder. Instead, an exothermic reaction may be generated at the filter thereby raising the filter temperature and raising the temperature of the exhaust gas reaching the turbine. In one example, the filter may include a catalyzed washcoat such that the fuel injected during the exhaust stroke is exothermically reacted in the filter with excess oxygen. The injection may be stopped, for example, in response to an increase in the boost above the threshold (for example, the boost increasing to a level enabling the requested torque to be provided), or the engine torque increasing above the requested torque. In some examples, the threshold may be based on a desired boost amount. For example, the injection may be stopped when a difference between a desired and actual boost is above a threshold. Alternatively, the injection may be stopped in response to an increase in exhaust temperature (or filter temperature) above a threshold and/or a drop in the amount of stored particulates below a threshold. Further still, in some embodiments, a subsequent engine fuel injection (for example, during a subsequent engine cycle) may be adjusted based on the amount of fuel previously injected (for example, to maintain a desired air-fuel ratio).

In this way, by late injecting fuel upstream of a particulate filter under selected boosted operating conditions, boost issues arising at tip-in may be addressed during filter regeneration.

Figure 5:
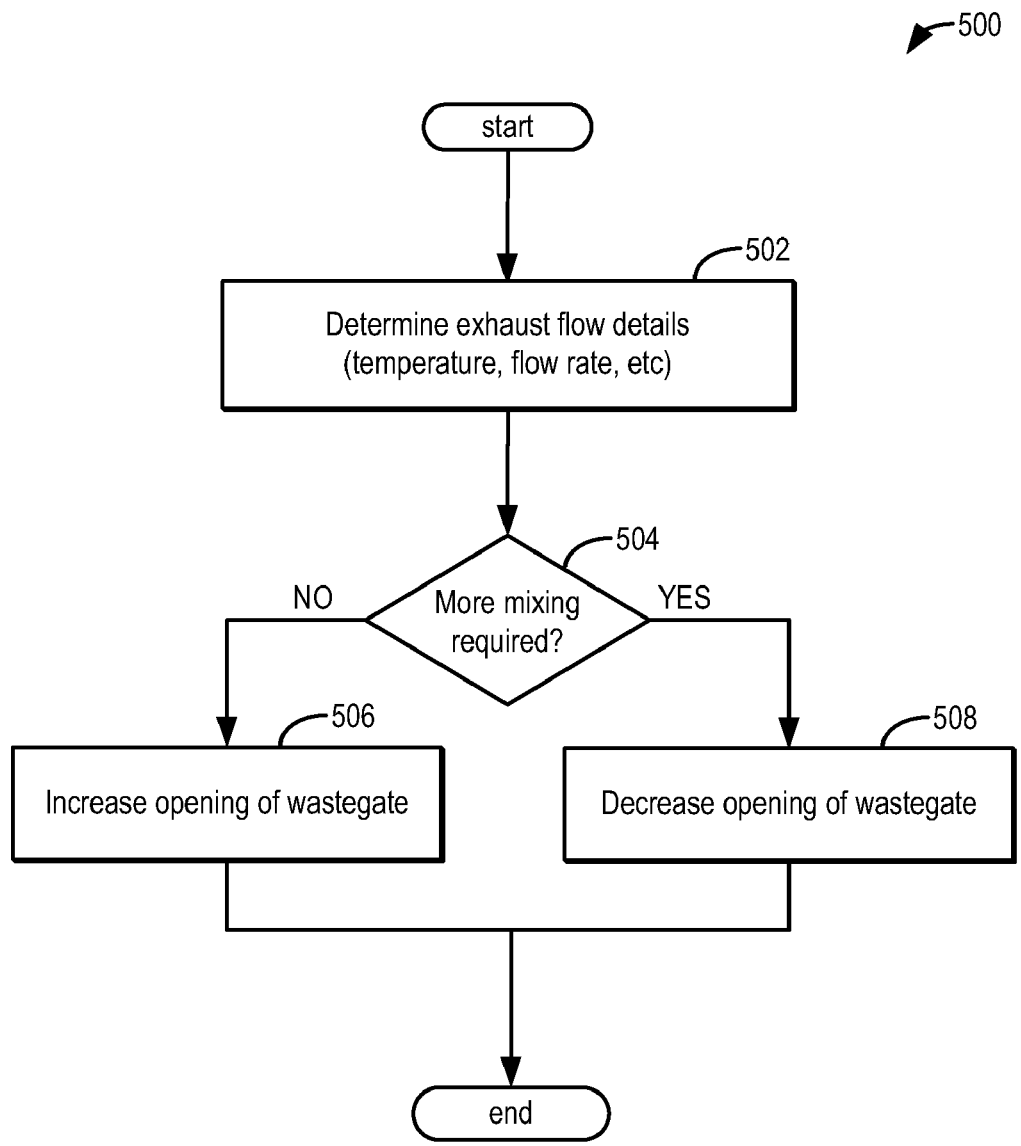
FIG. 5 shows a high level flow chart for addressing reductant mixing issues.

Now turning to FIG. 5, a routine 500 is illustrated for adjusting a wastegate position to address SCR catalyst reductant mixing issues. Routine 500 may be performed as part of control routine 300, specifically at 316.

At 502, the routine may determine exhaust flow characteristics. These may include, for example, an exhaust flow rate, an exhaust temperature, an amount of exhaust directed to the catalyst versus an amount of exhaust recirculated to the engine intake via EGR (for example, via LP-EGR and/or HP-EGR), etc. The routine may also determine injection details, such as, an injection amount, an injection flow rate, and an injection pressure. At 504, it may be determined whether more mixing of the exhaust gas and the injected reductant is required. As such, mixing conditions may be estimated or inferred from the determined exhaust flow details and reductant injection details. For example, higher injection pressures may enable better mixing. Similarly, higher exhaust temperatures may enable better mixing due to an improved vaporization of the injected reductant. An engine controller may include a look-up table specifying a range of exhaust temperature, exhaust flow rate, turbine speed, wastegate position, and injection pressure combinations wherein substantial reductant mixing may be enabled. In one example, mixing issues may be identified if the exhaust and injection parameters, as determined at 502, are outside the desired range/combination. Alternatively, mixing issues may be inferred if the wastegate position is greater than a first threshold and the turbine speed is below a second threshold.

If more mixing is required, at 508, the wastegate position may be adjusted to increase an amount of reductant that is directed to the SCR catalyst via the turbine. In one example, reducing a wastegate opening may increase reductant mixing. In comparison, if more mixing is not required, at 506, the wastegate position may be adjusted to decrease the amount of reductant that is directed to the SCR catalyst via the turbine. In one example, increasing a wastegate opening may decrease reductant mixing. However, it will be appreciated that changing the amount of reductant delivered via the turbine may not affect the net amount of reductant delivered to the catalyst.

In this way, an engine controller may be configured to inject reductant into the exhaust upstream of the turbine, mix the injected reductant with exhaust gas via the turbine, and deliver the mixed reductant to the downstream catalyst. By injecting the reductant upstream of the turbine, the temperature difference of exhaust across the turbine may be advantageously used to improve the vaporization of the reductant than, for example, if the reductant was injected downstream of the turbine. Specifically, the higher exhaust temperature upstream of the turbine may be used to better vaporize the injected reductant, thereby improving its miscibility with exhaust gas. Additionally, the turbulent flow through the blades and vanes of the turbine may further atomize the injected reductant and enable better mixing. Further still, by improving mixing of the injected reductant without an additional mixer, or mixing section, component and cost reduction may be achieved. The well mixed reductant may then be delivered to the SCR catalyst at lower exhaust temperatures downstream of the turbine, thereby reducing over-temperature catalyst issues. Wastegate adjustments made herein may be compensated for in the parent routine 300, at 326, as previously elaborated with reference to FIG. 3.

Figure 6:
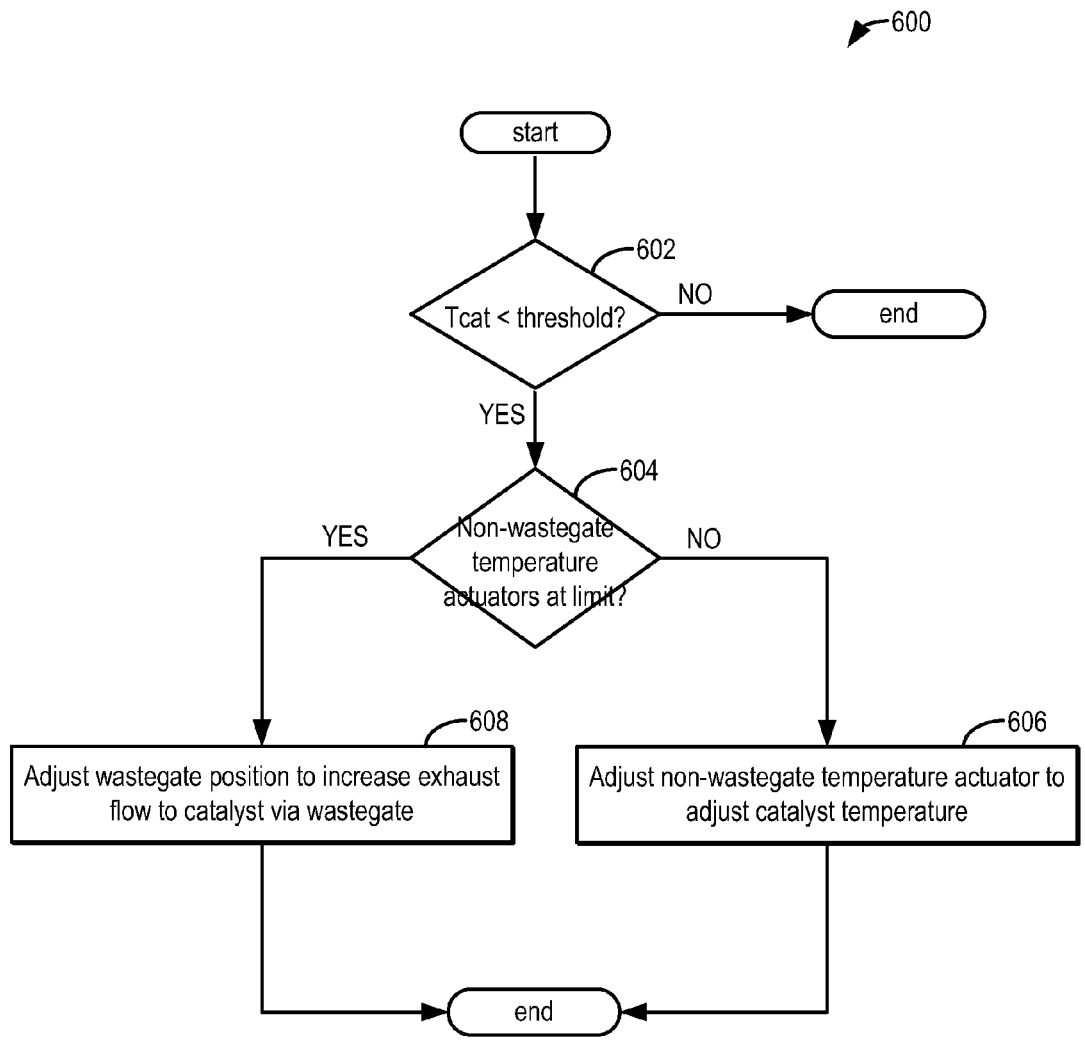
FIG. 6 shows a high level flow chart for controlling the temperature of a downstream SCR catalyst by adjusting an upstream wastegate.

Now turning to FIG. 6, a routine 600 is illustrated for adjusting a wastegate position to thereby adjust the SCR catalyst temperature to a desired catalyst temperature, or temperature range. Routine 600 may be performed as part of control routine 300, specifically at 320.

At 602, it may be determined whether the SCR catalyst temperature (Tcat) is below a threshold temperature, or temperature range. If the catalyst temperature is below the threshold temperature, then at 604, the routine may determine whether the non-wastegate temperature actuators are limited. For example, if actuators other than the wastegate may be adjusted to influence catalyst temperature, then as a first approach, such other actuators may be used to address the temperature issue. Thus, if a temperature actuator other than the wastegate, such as injection timing, is available for modulation to thereby adjust the catalyst temperature and bring it to the desired temperature range, then at 606, the routine may address the catalyst temperature issues with the non-wastegate temperature actuator.

In comparison, if all the non-wastegate temperature actuators are limited (e.g., due to combustion stability limits, torque control, emission limits, etc.), then at 608, the routine may address the catalyst temperature issue with a wastegate adjustment. Specifically, the wastegate opening may be adjusted (for example, increased) to thereby increase an exhaust flow to the catalyst via the wastegate. In one example, the adjustment may be based on the catalyst temperature. In another example, the adjustment may be based on exhaust temperature, and the catalyst temperature may be inferred from the exhaust temperature. In still another example, the adjustment may be based on a degree of filter regeneration of the upstream particulate filter. The adjustment may include, for example, increasing a wastegate opening when the catalyst temperature is below the desired catalyst temperature, and decreasing a wastegate opening when the catalyst temperature is above the desired catalyst temperature. In another example, the adjustment may further include increasing the opening of the wastegate during filter regeneration. For example, during filter regeneration there may be a risk of over temperature conditions occurring in the downstream turbine (e.g., turbine 54). Thus, under certain conditions, the wastegate opening may be increased to avoid over temperature conditions during regeneration.

The wastegate adjustment in response to SCR catalyst temperature being below a desired temperature may enable a larger portion of exhaust gas to bypass the turbine and reach the catalyst directly. As such, during passage through the turbine, at least a portion of heat may be extracted from the heated exhaust by the turbine. Thus, the temperature of exhaust reaching the catalyst through the turbine may be lower than the temperature of exhaust reaching the catalyst via the wastegate. By increasing the amount of heated exhaust reaching the catalyst via the wastegate during conditions when the catalyst is below the desired operating temperature, the temperature of the catalyst may be raised. Wastegate adjustments made herein may be compensated for in the parent routine 300, at 326, as previously elaborated with reference to FIG. 3. In some examples, wastegate adjustments may further depend on turbocharger boost and speed. For example, the wastegate valve may be adjusted to avoid over temperature conditions in the turbocharger and meet boost requirements.

In this way, a turbine wastegate may be advantageously used to adjust an amount of heated exhaust delivered to a downstream SCR catalyst, thereby controlling the catalyst temperature. By adjusting an initial wastegate position based on the operating mode of an upstream particulate filter, and thereafter adjusting the wastegate position to adjust an amount of hot exhaust, as used during filter regeneration, that is delivered to the catalyst via the wastegate, the catalyst temperature may be controlled while co-coordinating the operation of the various emission control devices. By adjusting the injection of reductant upstream of the turbine based on the final wastegate position, as elaborated below in FIG. 7, the amount of reductant delivered to the catalyst may also be controlled. By controlling the temperature and reductant dosage of an SCR catalyst, the catalyst performance may be improved and the NOx content of exhaust emissions may be reduced.

Figure 7:
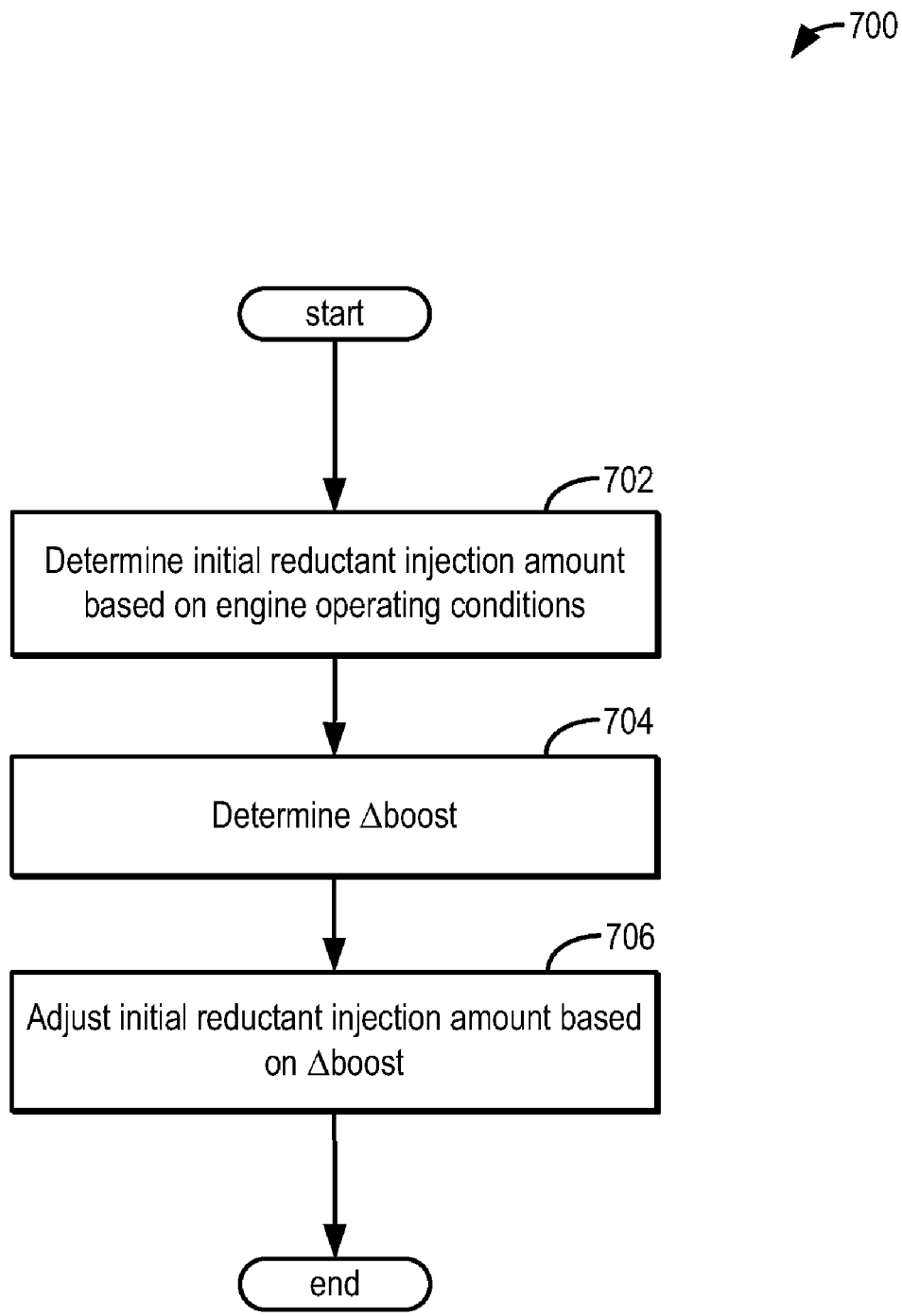
FIG. 7 shows a high level flow chart for adjusting reductant injection based on boost.

Now turning to FIG. 7, a routine 700 is illustrated for adjusting an amount of reductant injected upstream of the turbine responsive to wastegate adjustments, to thereby adjust an amount of reductant delivered to a downstream SCR catalyst. Routine 700 may be performed as part of control routine 300, specifically at 324. In particular, the reductant injection may compensate for boost changes arising from preceding wastegate adjustments.

At 702, the routine may determine an initial reductant injection amount based on engine operating conditions. For example, the initial reductant injection amount may be adjusted based on the boost estimated in response to the driver torque demand, the amount of reductant already present on the SCR catalyst, catalyst temperature, exhaust NOx levels, etc. At 704, the routine may determine if there are any changes in boost. For example, it may be determined if any boost changes have arisen, or are expected, due to the preceding wastegate adjustments (as elaborated in FIG. 3 at 312-322). Alternatively, it may be determined if there is any sudden and temporary change in boost (for example, a sudden temporary drop in boost). At 706, the initial reductant amount may be adjusted based on the change in boost. In one example, the adjustment may include temporarily decreasing an amount of reductant injected when boost falls below a threshold (for example, during a sudden drop in boost). The injection adjustment may then be stopped when the boost returns to the desired value. In alternate embodiments, the adjustment may include increasing reductant injection as wastegate opening decreases, decreasing an amount of reductant injected as the wastegate opening increases, increasing reductant injection as turbine speed increases, and/or increasing reductant injection in the presence of boost. In this way, an engine controller may be configured to adjust an amount of reductant injected into the exhaust based on previous wastegate adjustments.

Figure 8:
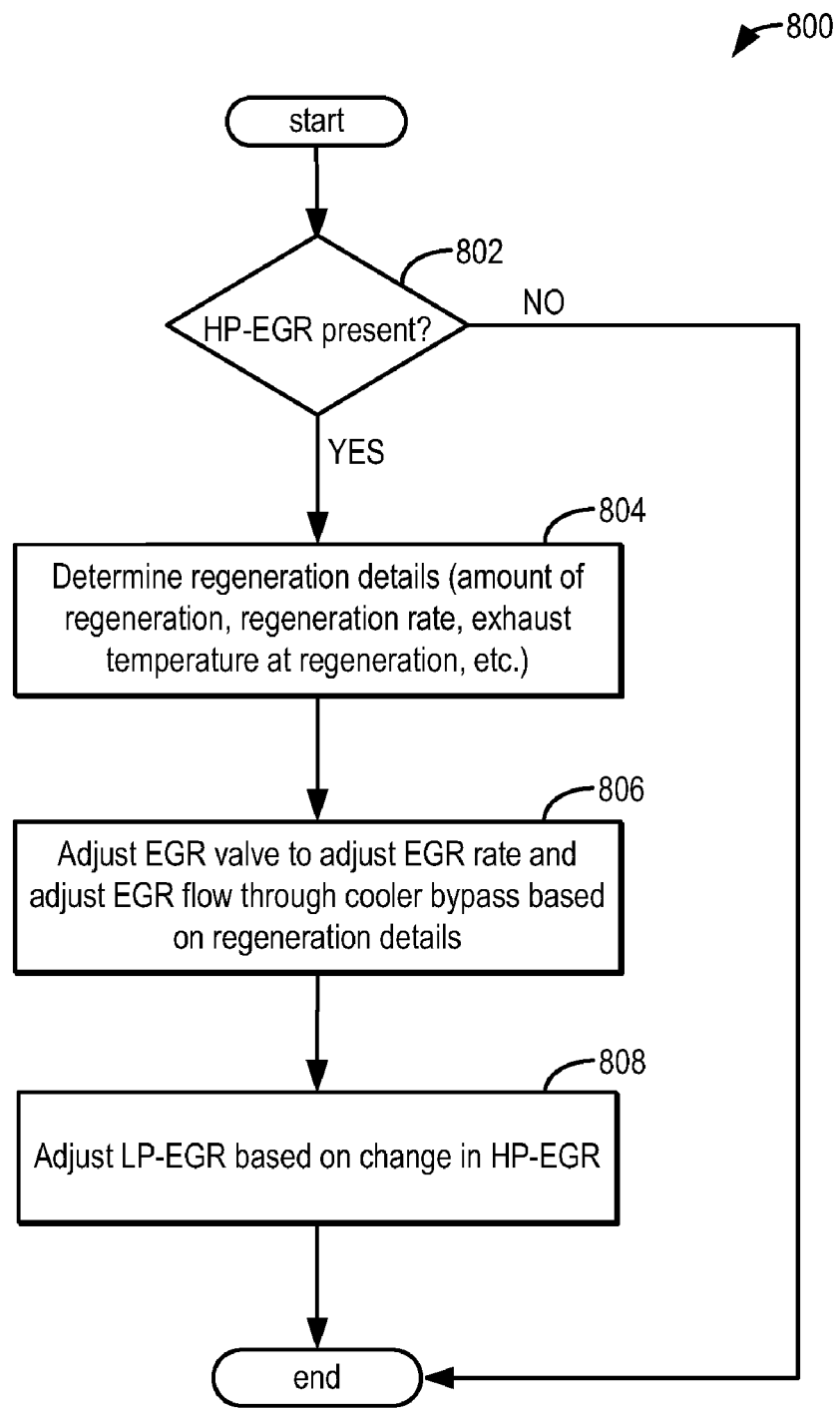
FIG. 8 shows a high level flow chart for adjusting exhaust gas recirculation based on filter regeneration conditions.

Now turning to FIG. 8, a routine 800 is illustrated for adjusting a ratio of exhaust gas recirculated to the engine intake via the HP-EGR and the LP-EGR passages, during a filter regeneration operation, based on engine operating conditions. Routine 800 may be performed as part of control routine 300, specifically at 328.

At 802, it may be determined whether HP-EGR is present or desired. As such, during HP-EGR, at least a portion of exhaust may be diverted from upstream of the turbine, and downstream of the particulate filter, via the HP-EGR passage, to the engine intake downstream of the compressor. In one example, HP-EGR may be present (or desired) due to exhaust NOx levels being above a threshold. If HP-EGR is present, then at 804, filter regeneration details may be determined. These may include, for example, an amount of regeneration, a rate of regeneration, exhaust temperature during regeneration, exhaust flow rate during regeneration, an amount of particulates stored, an expected duration of regeneration, etc. At 806, the routine may adjust an amount of diverted exhaust gas based on the estimated filter operating conditions, such as the filter temperature and/or filter regeneration. Specifically, in response to HP-EGR during filter regeneration, the routine may adjust an HP-EGR valve to thereby adjust an amount and/or rate of HP-EGR based on the regeneration details.

In one example, if HP-EGR is present at the start of filter regeneration, in anticipation of the heated exhaust used during filter regeneration, the amount of exhaust gas recirculated to the engine intake from upstream of the turbine and downstream of the filter may be decreased by decreasing the opening of an HP-EGR valve. For example, the amount of heated exhaust diverted along EGR passage 63 may be decreased by reducing the opening of HP-EGR valve 29. Additionally, the EGR flow through the cooler bypass may be correspondingly adjusted. In one example, substantially no exhaust gas may be diverted to the engine intake via HP-EGR, for example, by completely closing the HP-EGR valve. By reducing the amount of heated exhaust that is recirculated to the engine intake during filter regeneration, the undesirable effects of hot EGR flow on exhaust NOx emissions and engine performance may be reduced. Additionally, the thermal demands on the EGR cooler may also be reduced, thereby improving engine fuel efficiency.

In another example, if HP-EGR is present at the end of filter regeneration, in anticipation of cooler exhaust used after filter regeneration, the amount of exhaust gas recirculated to the engine intake from upstream of the turbine and downstream of the filter may be increased by increasing the opening of an HP-EGR valve. For example, the amount of heated exhaust diverted (along exhaust passage 63) may be increased by increasing the opening of HP-EGR valve 29. Additionally, the EGR flow through the cooler bypass may be correspondingly adjusted. By increasing the amount of heated exhaust that is recirculated to the engine intake after passing through the filter, a clean EGR flow may be provided to the intake, thereby reducing EGR cooler, EGR valve and intake manifold degradation and improving engine performance and exhaust emissions.

As such, exhaust temperature changes at the start and stop of filter regeneration may be larger than exhaust temperature changes in the middle of filter regeneration. Consequently, corresponding EGR adjustments at the start and stop of filter regeneration may be larger than exhaust temperature changes in the middle of filter regeneration. In one example, the EGR adjustments may be gradually adjusted based on an exhaust temperature profile.

In alternate embodiments, the adjustment may be made responsive to the operating mode of the filter. For example, an amount of diverted exhaust gas may be increased when the filter is storing particulates (storing mode) and the amount of diverted exhaust gas may be decreased when the filter is regenerating (regeneration mode). In yet another embodiment, the adjustment may be made responsive to filter temperature. For example, an amount of diverted exhaust gas may be increased when the filter temperature is below a threshold and the amount of diverted exhaust gas may be decreased when the filter temperature is above the threshold.

At 808, an amount of LP-EGR may be adjusted based on the changes to the amount of HP-EGR. Specifically, after a first amount of exhaust gas is diverted from downstream of the particulate filter and upstream of the turbine to the engine intake system (HP-EGR), the amount based on a rate of particulate filter regeneration, a second amount of exhaust gas is diverted from downstream of the particulate filter and downstream of the turbine to the engine intake system (LP-EGR), the second amount adjusted to counteract the adjustment of the first amount. Furthermore, the total EGR flow may depend on whether particulate filter regeneration is occurring or not, as described above with regard to FIG. 6.

In one example, the ratio of HP-EGR and LP-EGR may be adjusted to maintain a net desired EGR rate or burned mass fraction or intake oxygen concentration. In another example, the ratio may be adjusted to achieve a desired manifold temperature. For example, if the amount of HP-EGR performed while the filter is regenerating results in higher intake manifold temperatures (for example, higher than a threshold), then the routine may reduce the amount of HP-EGR and correspondingly increase an amount of LP-EGR. In another example, if the amount of HP-EGR performed while the filter is regenerating results in lower intake manifold temperatures (for example, lower than a threshold), then the routine may increase the amount of HP-EGR and correspondingly decrease an amount of LP-EGR.

In this way, by adjusting an amount of HP-EGR and LP-EGR based on filter regeneration conditions, the operation of the various emission control devices may be co-ordinated with EGR operations while improving exhaust emissions.

In another example, a system of a turbocharged internal combustion engine comprises an exhaust passage including an SCR catalyst downstream of a turbocharger turbine, a particulate filter upstream of the turbine, an intake passage including a charge air cooler receiving at least some fresh intake air, and a high pressure exhaust gas recirculation system, the high pressure exhaust gas recirculation coupled to the exhaust passage upstream of the turbine and coupled to the intake passage upstream of the charge air cooler. In some embodiments wherein the high pressure exhaust gas recirculation passage is without an exhaust gas recirculation cooler, the system may further comprise a combined charge air cooler and high pressure exhaust gas recirculation bypass passage with an adjustable valve positioned therein.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The invention claimed is:

1. A method of operating an engine including a particulate filter positioned upstream of a turbocharger turbine, a catalyst positioned downstream of the turbine, and an EGR passage, comprising:
   diverting exhaust gas from downstream of the filter and upstream of the turbine to an engine intake via the EGR passage by adjusting an EGR valve in the EGR passage; and
   adjusting an amount of diverted exhaust gas based on filter operating conditions.

2. The method of claim 1, wherein the filter operating conditions include filter temperature and/or filter regeneration, and wherein diverting exhaust gas to the engine intake includes diverting exhaust gas to the engine intake downstream of a turbocharger compressor.

3. The method of claim 2, wherein the adjustment includes,
increasing an amount of diverted exhaust gas when the filter is storing particulates; and
decreasing an amount of diverted exhaust gas when the filter temperature is being regenerated.

4. The method of claim 1, wherein the adjustment includes,
decreasing an amount of diverted exhaust gas when filter temperature is above a threshold; and
increasing an amount of diverted exhaust gas when filter temperature is below the threshold.

5. The method of claim 1, wherein adjusting an amount of diverted exhaust gas includes reducing an opening of the EGR valve to decrease the amount of diverted exhaust and increasing the opening of the EGR valve to increase the amount of diverted exhaust, and wherein the EGR passage further includes an EGR cooler.

6. A method of operating a turbocharged engine including a particulate filter positioned upstream of a turbocharger turbine, a catalyst positioned downstream of the turbine, and first and second EGR passages coupled between an engine exhaust and engine intake, comprising:
diverting at least some exhaust gas from downstream of the particulate filter and upstream of the turbine to the engine intake via the first EGR passage; and
diverting at least some exhaust gas from downstream of the particulate filter and downstream of the turbine to the engine intake via the second EGR passage, wherein the diverting via the first EGR passage includes adjusting an opening of a first EGR valve in the first EGR passage, wherein diverting via the second EGR passage includes adjusting an opening of a second EGR valve in the second EGR passage, wherein the diverting at least some exhaust gas from downstream of the particulate filter and upstream of the turbine to the engine intake is performed during a first condition, wherein the diverting at least some exhaust gas from downstream of the particulate filter and downstream of the turbine to the engine intake is performed during a second condition, wherein the second condition includes exhaust gas temperature being above a threshold and/or presence of a turbocharger boost, and wherein during the second condition no exhaust gas is diverted from downstream of the particulate filter and upstream of the turbine to the engine intake, and wherein the first condition includes absence of boost.

7. The method of claim 6, wherein diverting at least some exhaust gas from upstream of the turbine includes diverting clean exhaust gas, the exhaust gas cleaned upon passage through the filter, and wherein diverting at least some exhaust gas from downstream of the turbine includes diverting clean exhaust gas, the exhaust gas cleaned upon passage through the filter.

8. The method of claim 6, wherein the diverting at least some exhaust gas from downstream of the particulate filter and upstream of the turbine to the engine intake includes diverting exhaust gas to the engine intake downstream of a turbocharger compressor.

9. The method of claim 6, wherein the diverting at least some exhaust gas from downstream of the particulate filter and downstream of the turbine to the engine intake includes diverting exhaust gas to the engine intake upstream of a turbocharger compressor via the first EGR passage.

10. The method of claim 6, further comprising adjusting a first amount of exhaust gas diverted from downstream of the particulate filter and upstream of the turbine to the engine intake based on a rate of particulate filter regeneration, and further adjusting a second amount of exhaust gas diverted from downstream of the particulate filter and downstream of the turbine to the engine intake to counteract the adjustment of the first amount.

11. The method of claim 6, wherein the diverting at least some exhaust gas from downstream of the particulate filter and upstream of the turbine to the engine intake is adjusted based on at least one of an exhaust gas temperature and an operating mode of the filter.

12. The method of claim 11, wherein the adjustment includes, increasing an amount of exhaust gas that is diverted when the exhaust temperature is below a threshold and/or when the filter is in a storing mode.

13. The method of claim 11, wherein the adjustment includes, decreasing an amount of exhaust gas that is diverted when the exhaust temperature is above a threshold and/or when the filter is in a regeneration mode.

14. A vehicle system, comprising:
an engine including an intake and an exhaust;
a turbocharger including a turbine and a compressor;
an EGR passage, including an EGR valve, for routing at least a portion of exhaust gas from the engine exhaust to the engine intake;
a particulate filter positioned upstream of the turbine;
an SCR catalyst positioned downstream of the turbine; and
a control system configured to,
adjust an opening of the EGR valve to divert exhaust gas from downstream of the filter to the engine intake via the EGR passage; and
adjust an amount of exhaust gas diverted based on a degree of filter regeneration.

15. The system of claim 14 further comprising, a reductant injector coupled downstream of the filter and upstream of the turbine.

16. The system of claim 14, wherein diverting exhaust gas to the engine intake includes diverting exhaust gas from downstream of the turbine to upstream of the compressor.

17. The system of claim 14, wherein the adjustment includes increasing an amount of exhaust gas diverted when filter temperature is below a threshold and decreasing an amount of exhaust gas diverted when filter temperature is above the threshold.

18. The system of claim 14, wherein the adjustment includes decreasing an amount of exhaust gas diverted as the degree of filter regeneration increases.

* * * * *